United States Patent
Saito et al.

(10) Patent No.: US 9,975,771 B2
(45) Date of Patent: May 22, 2018

(54) PROCESS FOR PURIFYING PHOSPHORUS PENTAFLUORIDE

(71) Applicant: Kanto Denka Kogyo co., Ltd., Tokyo (JP)

(72) Inventors: Katsuhiro Saito, Tokyo (JP); Shinji Mita, Tokyo (JP); Hiromi Oya, Okayama (JP); Shinsuke Katayama, Okayama (JP); Yasuyuki Fujiwara, Okayama (JP); Ichiro Morimoto, Okayama (JP); Hiroyuki Uehara, Gunma (JP); Norihisa Kimura, Okayama (JP)

(73) Assignee: KANTO DENKA KOGYO CO., LTD., Tokyo (JP)

( * ) Notice: Subject to any disclaimer, the term of this patent is extended or adjusted under 35 U.S.C. 154(b) by 104 days.

(21) Appl. No.: 15/026,008

(22) PCT Filed: Sep. 26, 2014

(86) PCT No.: PCT/JP2014/075633
§ 371 (c)(1),
(2) Date: Mar. 30, 2016

(87) PCT Pub. No.: WO2015/050056
PCT Pub. Date: Apr. 9, 2015

(65) Prior Publication Data
US 2016/0244331 A1 Aug. 25, 2016

(30) Foreign Application Priority Data

Oct. 4, 2013 (JP) ................... 2013-208954

(51) Int. Cl.
*C01B 25/10* (2006.01)

(52) U.S. Cl.
CPC .................. *C01B 25/10* (2013.01)

(58) Field of Classification Search
CPC ...................................... C01B 25/10
(Continued)

(56) References Cited

U.S. PATENT DOCUMENTS

| 3,907,977 A | * | 9/1975 | Wiesboeck | .......... | C01D 15/005 423/464 |
| 6,514,474 B1 | | 2/2003 | Kikuyama et al. | | |

(Continued)

FOREIGN PATENT DOCUMENTS

| CN | 102009972 A | 4/2011 | | |
| DE | 19712988 A1 | * | 1/1998 | .......... C01D 15/005 |

(Continued)

OTHER PUBLICATIONS

International Search Report, PCT/JP2014/075633, dated Dec. 22, 2014.

*Primary Examiner* — Ngoc-Yen Nguyen
(74) *Attorney, Agent, or Firm* — Young & Thompson

(57) ABSTRACT

A method for obtaining high-purity phosphorus pentafluoride ($PF_5$), which is industrially useful in the fields of semiconductors and batteries, from $PF_5$ containing a gas mixture of HCl, HF, and so on. Specifically, provided is a process for purifying phosphorus pentafluoride including (1) an immobilization step in which phosphorus pentafluoride containing a mixture is brought into contact with a metal fluoride ($MF_n$; M is an n-valent metal) having a specific surface area of 1.0 m$^2$/g or more at 40° to 150° C. to immobilize phosphorus pentafluoride in the form of a hexafluorophosphate ($M(PF_6)_n$), (2) a separation step in which the mixture remaining in the gas phase is expelled out of the reaction system to separate the mixture from the hexafluorophosphate, and (3) a heat-decomposition step in which the hexafluorophosphate freed of the mixture is (Continued)

heated at 150° to 400° C. under a pressure of −0.1 to 0.1 MPa·G to give phosphorus pentafluoride.

20 Claims, 1 Drawing Sheet

(58) Field of Classification Search
USPC .......................................................... 423/301
See application file for complete search history.

(56) References Cited

U.S. PATENT DOCUMENTS

| | | |
|---|---|---|
| 8,470,278 B2 | 6/2013 | Waki et al. |
| 2001/0041158 A1 | 11/2001 | Smith et al. |
| 2003/0143145 A1 | 7/2003 | Kikuyama et al. |
| 2009/0081559 A1* | 3/2009 | Oe .................. C01D 15/005 |
| | | 429/342 |
| 2009/0211449 A1 | 8/2009 | Olschimke et al. |
| 2009/0242840 A1 | 10/2009 | Olschimke et al. |
| 2011/0189538 A1 | 8/2011 | Waki et al. |
| 2011/0286905 A1 | 11/2011 | Waki et al. |
| 2013/0004402 A1* | 1/2013 | Smith ................ C01D 15/005 |
| | | 423/301 |
| 2013/0177491 A1* | 7/2013 | Suzuki .................... C01B 25/10 |
| | | 423/301 |
| 2015/0093316 A1* | 4/2015 | Luly ...................... C01B 25/10 |
| | | 423/301 |

FOREIGN PATENT DOCUMENTS

| | | |
|---|---|---|
| JP | 60-251109 | 12/1985 |
| JP | 04-175216 | 6/1992 |
| JP | 2000-154009 | 6/2000 |
| JP | 2010-042937 | 2/2010 |

* cited by examiner

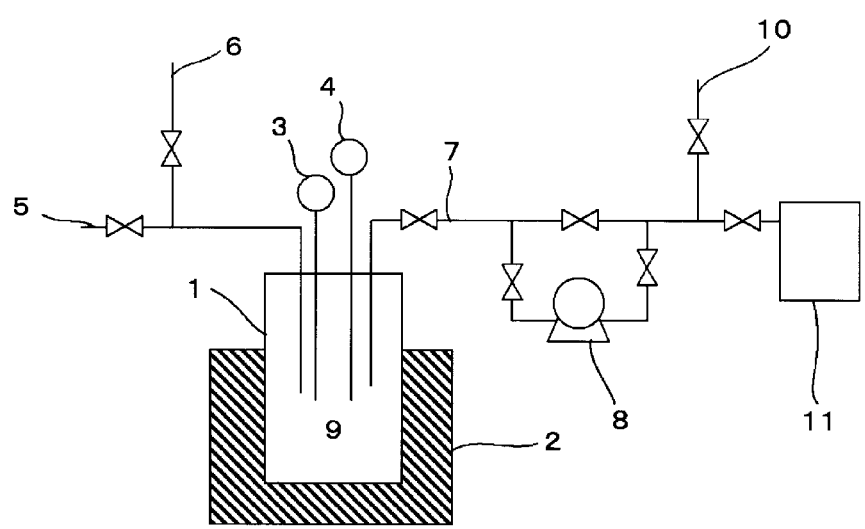

PROCESS FOR PURIFYING PHOSPHORUS PENTAFLUORIDE

TECHNICAL FIELD

This invention relates to a method for obtaining high-purity phosphorus pentafluoride, specifically a process for purifying phosphorous pentafluoride. Phosphorus pentafluoride is used as a starting material for preparing lithium hexafluorophosphate as an electrolyte of lithium ion secondary batteries, silver hexafluorophosphate useful in the lithography and photoresist fields, and ammonium hexafluorophosphate as a starting material for preparing pharmaceutical intermediates.

BACKGROUND ART

Phosphorus pentafluoride ($PF_5$) is an industrially useful material in the fields of semiconductors and batteries. In these fields, a mixture in a starting material can exert an adverse influence on the performance or safety of the final product. Therefore, high purity is required of the starting material for use in these fields.

Various processes for preparing phosphorus pentafluoride ($PF_5$) have so far been proposed. In order to acquire high-purity $PF_5$ effectively, it is of concern how to separate $PF_5$ from a mixture with a raw material and a by-product associated with the preparation process. In particular, it is an issue how to separate $PF_5$ from a mixture with HF or $SO_3$, which is a starting material of $PF_5$; HCl, $POF_3$, or $PF_3$, which is by-produced in the preparation of $PF_5$; or $SO_2$ or $H_2S$, which is contained in the starting material HF.

Patent Literature 1 below discloses synthesis of $PF_5$ by the reaction between $HPF_6$ with a sulfur-based acid under high pressure. This process involves by-production of fluorosulfuric acid ($HSO_3F$), sulfur trioxide ($SO_3$), HF, and so forth. Separation between $PF_5$ and these by-products needs purification equipment including a large-sized distillation tower.

Patent Literatures 2 and 3 disclose synthesis of $PF_5$ by the reaction between liquid or gaseous HF and phosphorus pentachloride ($PCl_5$). These processes by-produce hydrogen chloride (HCl) gas in an amount five times the equivalent of $PF_5$. Because the boiling point of HCl is −84.9° C., close to the boiling point of $PF_5$ (−84.8° C.), separation by an ordinary distillation technique is difficult, which renders the processes industrially disadvantageous.

As mentioned, preparation of $PF_5$ has the problem that HF, HCl, $F_2$, $Cl_2$, $CO_2$, $SO_3$, $SO_2$, $H_2S$, $PF_3$, $POF_3$, $NO_2$, $NO_3$, $NH_3$, and so on, some of which are the starting materials and some others are by-produced in the reaction, are entrained as a mixture in the produced $PF_5$. Available purification methods are limited, however, because $PF_5$ is highly corrosive and labile in water and air.

Patent Literatures 4 and 5 disclose a method in which an HF carrier gas is brought into contact with a starting material comprising a phosphorus and fluorine atom to extract $PF_5$ in the carrier gas. However, in order to recover and separate HF used as a carrier gas, the method needs condensation equipment using a coolant for cooling to −50° to 0° C.

Patent Literatures 6 and 7 propose processes for separating $PF_5$ and HCl using an ionic liquid. The processes are not economical, however, because of the use of expensive ionic liquids for adsorption and desorption. Moreover, when an HCl concentration is higher than the concentration of $PF_5$, the process is not efficient because it is necessary to remove the large amount of HCl by adsorption to the ionic liquid.

Thus, it has not been easy to obtain high-purity $PF_5$ through general synthesis processes including a purification technique making use of a difference in boiling point or an ordinary gas separation technique by removing a mixture of components contained in the starting materials or components by-produced during reaction using simple equipment.

CITATION LIST

Patent Literature

Patent Literature 1: US 2001/0041158A1
Patent Literature 2: JP 60-251109A
Patent Literature 3: JP 04-175216A
Patent Literature 4: US 2011/0189538A1
Patent Literature 5: US2011/0286905A1
Patent Literature 6: US 2009/0242840A1
Patent Literature 7: US 2009/0211449A1

SUMMARY OF THE INVENTION

Problem to be Solved by the Invention

It is an object of the invention to provide high-purity phosphorus pentafluoride ($PF_5$), which is an industrially useful compound, from $PF_5$ containing a gas mixture of hydrogen chloride (HCl), hydrogen fluoride (HF), and so on.

Means for Solving the Problem

As a result of extensive investigations, the inventors have found that, on contacting low-purity phosphorus pentafluoride ($PF_5$), even if containing a mixture (impurity) of HF, HCl, $F_2$, $Cl_2$, $CO_2$, $SO_3$, $SO_2$, $H_2S$, $P_3$, $POF_3$, $NO_2$, $NO_3$, and $NH_3$, with a metal fluoride ($MF_n$, wherein M is an n-valent metal), $PF_5$ is efficiently and selectively immobilized on the metal fluoride in the form of a hexafluorophosphate [$M(PF_6)_n$] and that the mixture of HF, HCl, $F_2$, $Cl_2$, $CO_2$, $SO_3$, $SO_2$, $H_2S$, $PF_3$, $POF_3$, $NO_2$, $NO_3$, or $NH_3$ remaining in the reaction gas phase is easily expelled from the reaction system, thereby to provide a high-purity hexafluorophosphate. The inventors have also found that the resulting hexafluorophosphate decomposes on being heated to provide high-purity phosphorus pentafluoride easily and selectively. The invention has thus been completed.

The invention provides 1) a process for purifying phosphorus pentafluoride described below and combinations of the process 1) with preferred embodiments 2) to 7) described below.

1) A process for purifying phosphorus pentafluoride including (1) an immobilization step in which phosphorus pentafluoride ($PF_5$) containing a mixture is brought into contact with a metal fluoride ($MF_n$, wherein M is an n-valent metal) having a specific surface area of 1.0 m²/g or more at 40° to 150° C. to immobilize phosphorus pentafluoride in the form of a hexafluorophosphate ($M(PF_6)_n$), (2) a separation step in which the mixture remaining in the gas phase of (1) the immobilization step (reaction system) is expelled out of the reaction system to separate the mixture from the hexafluorophosphate, and (3) a heat-decomposition step in which the hexafluorophosphate freed of the mixture is heated at 150° to 400° C. under a pressure of −0.1 to 0.1 MPa·G to give phosphorus pentafluoride.

2) The process 1), wherein the mixture in phosphorus pentafluoride ($PF_5$) used in (1) the immobilization step contained at least one of HF, HCl, $F_2$, $Cl_2$, $CO_2$, $SO_3$, $SO_2$, $H_2S$, $PF_3$, $POF_3$, $NO_2$, $NO_3$, and $NH_3$.
3) The process 1), wherein the contact in (1) the immobilization step is carried out at a contact temperature of 40° to 150° C. under a pressure of 0 to 1.5 MPa·G
4) The process 1), wherein the metal fluoride ($MF_n$) used in (1) the immobilization step is a monovalent metal fluoride, the metal being at least one member selected from the group consisting of lithium, sodium, potassium, and cesium.
5) The process 1), wherein (2) the separation step is carried out by expelling the mixture remaining in the gas phase out of the reaction system to separate the mixture from a solid $M(PF_6)_n$.
6) The process 1), wherein (3) the heat-decomposition step is carried out by evolving phosphorus pentafluoride with a reduced content of the mixture under a pressure of −0.1 to 0.1 MPa·G and selectively discharging the evolved phosphorus pentafluoride from the reaction system.
7) The process 1), wherein the metal fluoride ($MF_n$) separated in the (3) heat-decomposing step is reused in (1) the immobilization step.

Effect of the Invention

The invention provides high-purity phosphorus pentafluoride ($PF_5$) that is an industrially useful material in the fields of semiconductors and batteries from low-purity $PF_5$ containing a gas mixture of HCL, HF, and so forth.

BRIEF DESCRIPTION OF THE DRAWING

FIG. 1 schematically illustrates an apparatus that can be used to carry out the purification process of the invention.

EMBODIMENTS FOR CARRYING OUT THE INVENTION

The process of the invention for obtaining high-purity phosphorus pentafluoride will be described.
The invention relates to a process for purifying phosphorus pentafluoride ($PF_5$). The process includes (1) an immobilization step in which phosphorus pentafluoride containing a mixture is brought into contact with a metal fluoride ($MF_n$, wherein M is an n-valent metal) having a specific surface area of 1.0 $m^2/g$ or more at 40° to 150° C. to immobilize phosphorus pentafluoride in the form of a hexafluorophosphate ($M(PF_6)_n$), (2) a separation step in which the mixture remaining in the gas phase of the immobilization step (reaction system) is expelled out of the reaction system to separate the mixture from the hexafluorophosphate, and (3) a heat-decomposition step in which the hexafluorophosphate freed of the mixture is heated at 150° to 400° C. under a pressure of −0.1 to 0.1 MPa·G to give phosphorus pentafluoride.
Each steps will be described in sequence.
Step 1 ((1) the Immobilization Step)
Step 1 will be described first. In step 1, low-purity phosphorus pentafluoride containing a mixture having at least one of HF, HCl, $F_2$, $Cl_2$, $CO_2$, $SO_3$, $SO_2$, $H_2S$, $PF_3$, $POF_3$, $NO_2$, $NO_3$, and $NH_3$ is brought into contact with a metal fluoride ($MF_n$) under heating to immobilize phosphorus pentafluoride in the form of a hexafluorophosphate. The immobilization facilitates selective removal of the mixture in the subsequent step. While the $MF_n$ (M: n-valent metal) used for immobilizing $PF_5$ is not particularly limited, M is preferably a monovalent metal ion, more preferably at least one atom selected from Li, Na, K, and Cs.

The contact between the phosphorus pentafluoride containing a mixture and the metal fluoride may be carried out using an apparatus including a container commonly used for solid-gas contact combined with a heater for heating the container.

Specifically, the apparatus may preferably include a reactor 1 in which $MF_n$ 9 is put, a heater 2, an inlet 5 for introducing the starting $PF_5$ gas, an outlet 7, and a measuring instrument, such as a pressure gauge 3 and a thermometer 4, set up as illustrated in FIG. 1. The reaction may be conducted in either a batchwise mode in which the steps of putting $MF_n$ 9 in the reaction system, feeding and immobilizing phosphorus pentafluoride containing a mixture, and removing the mixture are repeated or a circulatory mode in which phosphorus pentafluoride containing a mixture is continuously fed through the inlet to the reaction system previously containing $MF_n$ 9. In order to perform the following steps, e.g., the separation step and the heat-decomposition step, the apparatus may further include an inlet 6 for feeding an inert gas, an outlet 10 for expelling the mixture together with the inert gas, and a line for reducing the inner pressure of the reactor 1 having, e.g., a vacuum pump 8.

The reactor 1 is preferably made of a material having resistance to oxidation and corrosion by hydrogen fluoride, hydrogen chloride, phosphorus pentafluoride, and the like, such as Hastelloy, Inconel, Monel, or stainless steel.

Examples of the heater 2 include a Kanthal heater, a mantle heater, and a heating medium.

While the process for preparing the $PF_5$ containing a mixture is not particularly limited, processes starting with economically advantageous materials are preferably adapted, such as reaction between hydrogen fluoride (HF) and phosphorus pentachloride ($PCl_5$).

In the case where $PF_5$ to be immobilized on $MF_n$ is from the reaction between phosphorus pentachloride and hydrogen fluoride, hydrogen chloride is by-produced in an amount five times the equivalent of the product $PF_5$ to give a hydrogen chloride-rich composition. Even with such a composition, irrespective of the ratio of the mixture containing hydrogen chloride, hydrogen fluoride, etc. to the $PF_5$ to be immobilized (even if the ratio varies from 0.1% to 99.9%), the mixture of hydrogen chloride and so on is separated with ease because $PF_5$ is immobilized in the form of $M(PF_6)_n$.

The immobilization reaction temperature is 40° to 150° C., preferably 60° to 100° C. At temperatures lower than 40° C., the mixture (impurity) of at least one of HF, HCl, $F_2$, $Cl_2$, $CO_2$, $SO_3$, $SO_2$, $H_2S$, $PF_3$, $POF_3$, $NO_2$, $NO_3$, and $NH_3$ is taken in the metal fluoride ($MF_n$), resulting in poor purification efficiency. At temperatures higher than 150° C., decomposition of the hexafluorophosphate proceeds.

The reaction pressure is preferably 0.0 to 1.5 MPa·G, more preferably 0.0 to 0.2 MPa·G. Reaction under pressure higher than 1.5 MPa·G needs highly pressure-resistant equipment, which is unfavorable both for economy and safety.

The metal fluoride $MF_n$ to be brought into contact with the mixture-containing $PF_5$ may have various shapes, such as granular or lumpy shapes, but the specific surface area of the metal fluoride should be 1.0 $m^2/g$ or more and is preferably 10.0 $m^2/g$ or more. If the specific surface area is less than 1.0 $m^2/g$, the efficiency of the contact reaction with $PF_5$ is low, and a large quantity of the metal fluoride will be needed, which is uneconomical. The larger the specific surface area, the better the metal fluoride performs. There is no particular upper limit to the specific surface area.

The theoretically required amount of $MF_n$ is equimolar with respect to the $PF_5$ to be treated. In view of the solid-gas contact efficiency and the relation to the specific surface area of $MF_n$, $MF_n$ is preferably used in an amount of 1.5 equivalents or more with respect to the $PF_5$. While the upper limit of the amount of $MF_n$ is not limited, the amount of $MF_n$ is preferably 10 equivalents from economical points of view. A more preferred amount of $MF_n$ to be used is 1.5 to 2.0 equivalents.

Step 2 ((2) the Separation Step)

Step 2 will be described second. After the contact reaction and immobilization of $PF_5$ in the form of solid hexafluorophosphate ($M(PF_6)_n$) in step 1, the mixture (impurity) remaining in the gas phase is expelled from the reaction system in step 2. The mixture is thus easily separated from the solid $M(PF_6)n$ to leave a high-purity hexafluorophosphate. This is why step 2 follows step 1.

The apparatus for carrying out step 2 is desirably provided with a line for introducing an inert gas and a line for reducing the pressure using, e.g., a pump so as to separate the solid $M(PF_6)_n$ and the mixture. For example, the reactor 1 used to conduct step 1 may be utilized as such as an apparatus for carrying out the separation step by combining with an inlet 6 for introducing an inert gas, an outlet 10 for expelling the mixture together with the inert gas and a line for reducing the inner pressure of the reactor 1 including a vacuum pump 8 as stated earlier.

Step 3 ((3) the Heat-Decomposition Step)

Step 3 will be described third. In step 3, the hexafluorophosphate ($M(PF_6)_n$) free from the mixture as obtained in step 2 is heat-decomposed to evolve high-purity phosphorus pentafluoride ($PF_5$), which is taken out. The decomposition temperature is 150° to 400° C., preferably 150° to 300° C. At temperatures lower than 150° C., the rate of $PF_5$ evolution is too low to be industrially economical. At temperatures higher than 400° C., energy is wasted uneconomically.

Step 3 may be carried out using either a separate line dedicated to that purpose or the same reactor 1 and the same heater 2 as used in step 1.

In step 3, the inner pressure of the reaction system is reduced to discharge the evolved $PF_5$ from the reaction system, thereby to reduce the requisite decomposition temperature and increase the rate of $PF_5$ evolution. Pressure reduction may be achieved using, for example, a pump or an ejector. Specifically, the inner pressure is −0.1 MPa·G to +0.1 MPa·G, preferably −0.1 to 0.0 MPa·G. At a pressure lower than −0.1 MPa·G, an increased amount of energy is consumed, and a high vacuum device is required. At pressures higher than 0.1 MPa·G, the $PF_5$ production rate decreases.

Thus, the thermal decomposition is sufficiently effected at the temperature range of from 150° to 300° C. to more economical advantage. This is considered to be because the balance of equation (1) shown below moves to the right as the produced $PF_5$ is driven out of the reaction system, resulting in an increase of the $PF_5$ evolution rate.

$$M(PF_6)_n \rightarrow nPF_5 + MF_n \quad (1)$$

After the heat-decomposition of $M(PF_6)_n$ and collection of $PF_5$, the remaining $MF_n$ may be reused to be contacted by $PF_5$ to immobilize $PF_5$ into a solid hexafluorophosphate $M(PF_6)_n$. The immobilization-heat decomposition cycle is allowed to be repeated as far as the $MF_n$ maintains the proper specific surface area.

EXAMPLES

The invention will now be illustrated in greater detail with reference to Examples and Comparative Examples, but it should be understood that the invention is not construed as being limited thereto.

Example 1

In a 1.5-liter stainless steel-made cylindrical reactor equipped with a thermometer, a pressure gauge, and a heater was put 9.3 g (0.36 mol) of LiF having an average specific surface area of 13.7 m²/g and heated to 80° C. A mixed gas of 40.4 g (0.32 mol) of $PF_5$, HCl, and HF ($PF_5$/HCl/HF=1/5/0.5 by mol; $PF_5$ purity: 15.38 mol %) was introduced into the reactor at 100 kPa·G. After making sure that the $PF_5$ gas reacted with LiF and the inner pressure decreased to 83 kPa·G, the remaining HCl and HF were expelled from the reactor to leave a solid weighing 41.5 g.

The solid was analyzed to ascertain formation of 38.4 g (0.25 mol) of $LiPF_6$. The acid content in the solid was found to be 1.1 wt % by neutralization titration.

The resulting $LiPF_6$ (38.4 g, 0.25 mol) was returned to the reactor, and the inner pressure was reduced by a vacuum pump to −70 kPa·G. The $LiPF_6$ in the reactor was heated up to 100° C. to remove HF. The discharged gas was detoxified.

The $LiPF_6$ in the reactor was then heated to 200° C. The gas discharged by the vacuum pump was analyzed by FT-IR (IG-1000 from Otsuka Electronics Co., Ltd.) to ascertain formation of $PF_5$. The thus obtained $PF_5$ weighing 31.2 g (0.25 mol) was analyzed by FT-IR to find that the mixture contained less than 20 ppm of HCl and less than 50 ppm of HF. Accordingly, the purity of $PF_5$ was 99.99 mol %.

After two hours, evolution of $PF_5$ stopped. So, the heating was stopped, and the residual LiF (9.2 g, 0.35 mol) was taken out. As a result of analysis, the conversion of $LiPF_6$ to LiF was found to be 99%.

Example 2

In a stainless steel-made reaction tube having an inner diameter of 10 mm and equipped with a thermometer, a pressure gauge, and a heater was put 13.0 g (0.50 mol) of LiF having an average specific surface area of 13.7 m²/g and heated to 80° C. A mixed gas containing 39.6 g (0.31 mol) of $PF_5$, $SO_3$, and HF at a $PF_5$/$SO_3$/HF molar ratio of 1/0.2/0.5 ($PF_5$ purity: 58.82 mol %) was led through the reaction tube at atmospheric pressure to give 52.6 g of a solid, which was analyzed to ascertain formation of 38.2 g (0.25 mol) of $LiPF_6$.

The resulting $LiPF_6$ (38.2 g, 0.25 mol) was put into the reaction tube, and the inner pressure was reduced by a vacuum pump to −70 kPa·G. The $LiPF_6$ in the reaction tube was heated up to 200° C. The gas discharged by the vacuum pump was analyzed by FT-IR to ascertain formation of $PF_5$. The thus obtained $PF_5$ weighing 28.5 g (0.23 mol) was found to contain a mixture of less than 50 ppm of $SO_3$ and less than 50 ppm of HF. Accordingly, the purity of $PF_5$ was 99.99 mol %.

Example 3

In a stainless steel-made reaction tube having an inner diameter of 10 mm and equipped with a thermometer, a pressure gauge, and a heater was put 10.1 g (0.39 mol) of LiF having an average specific surface area of 13.7 m²/g and heated to 100° C. A mixed gas containing 45.8 g (0.36 mol)

of PF$_5$ and F$_2$ at a PF$_5$/F$_2$ molar ratio of 1/1 (PF$_5$ purity: 50.00 mol %) was led through the reaction tube at atmospheric pressure to give 43.8 g of a solid, which was analyzed to ascertain formation of 40.1 g (0.26 mol) of LiPF$_6$.

The resulting LiPF$_6$ (40.1 g, 0.26 mol) was put into the reaction tube, and the inner pressure was reduced by a vacuum pump to −70 kPa·G. The LiPF$_6$ in the reaction tube was heated up to 200° C. The gas discharged by the vacuum pump was analyzed by FT-IR to ascertain formation of PF$_5$. The thus obtained PF$_5$ weighing 32.6 g (0.26 mol) was found to contain less than 50 ppm of F$_2$. Accordingly, the purity of PF$_5$ was 99.99 mol %.

Example 4

In a stainless steel-made reaction tube having an inner diameter of 10 mm and equipped with a thermometer, a pressure gauge, and a heater was put 10.0 g (0.38 mol) of LiF having an average specific surface area of 14.2 m$^2$/g and heated to 80° C. A mixed gas containing 45.8 g (0.36 mol) of PF$_5$ and CO$_2$ at a PF$_5$/CO$_2$ molar ratio of 1/1 (PF$_5$ purity: 50.00 mol %) was led through the reaction tube at atmospheric pressure to give 44.8 g of a solid, which was analyzed to ascertain formation of 41.5 g (0.27 mol) of LiPF$_6$.

The resulting LiPF$_6$ (41.5 g, 0.27 mol) was put into the reaction tube, and the inner pressure was reduced by a vacuum pump to −70 kPa·G. The LiPF$_6$ in the reaction tube was heated up to 200° C. The gas discharged by the vacuum pump was analyzed by FT-IR to ascertain formation of PF$_5$. The thus obtained PF$_5$ weighing 33.7 g (0.27 mol) was found to contain less than 20 ppm of CO$_2$. Accordingly, the purity of PF$_5$ was 99.99 mol %.

Example 5

The same procedure as in Example 1 was repeated except for replacing the LiF with 10.1 g (0.24 mol) of NaF having an average specific surface area of 10.2 m$^2$/g to obtain 36.4 g (0.23 mol) of NaPF$_6$. The resulting NaPF$_6$ was put in the reactor, and the inner pressure was reduced to −70 kPa·G using the vacuum pump.

The NaPF$_6$ in the reactor was heated to 380° C. After gas separation, the resulting PF$_5$ (27.3 g, 0.22 mol) was found to have a mixture of less than 20 ppm of HCl and less than 50 ppm of HF, so that the purity of PF$_5$ was 99.99 mol %.

Example 6

A 6.8 g (0.26 mol) portion of the LiF recovered by heat decomposition in Example 1 was reused to carry out immobilization of PF$_5$ followed by heat decomposition in the same manner as in Example 1. As a result, 27.2 g (0.18 mol) of LiPF$_6$ was formed, and PF$_5$ (0.17 mol) was obtained in a yield of 98%. The evolved PF$_5$ contained less than 20 ppm of HCl and less than 50 ppm of HF. Accordingly, the purity of the PF$_5$ was 99.99 mol %.

Comparative Example 1

Influence of Contact Temperature in Immobilization Step

LiPF$_6$ (37.1 g, 0.24 mol) was obtained in the same manner as in Example 1, except for changing the gas contact temperature to 15° C. The acid content in the resulting solid was found to be 34 wt % by neutralization titration.

The resulting LiPF$_6$ was put in the reactor, the inner pressure was reduced by the vacuum pump to −70 kPa·G, and the LiPF$_6$ in the reactor was heated to 200° C. The evolved PF$_5$ (30.1 g, 0.23 mol) contained more than 100 ppm of HF.

Comparative Example 2

Influence of Specific Surface Area

The same procedure as described in Example 1 was followed except for using LiF having an average specific surface area of 0.47 m$^2$/g. While the amount of PF$_5$ produced was 32.4 g (0.26 mol), substantially no reduction in pressure was observed after gas introduction, and the HF content in the resulting PF$_5$ was 7.7 mol %, which was the same as before the operation. The same operation was repeated 10 times, but the final yield of LiPF$_6$ was as low as 1.7 g (0.01 mol).

Comparative Example 3

Influence of Pressure in Decomposition Step (Effect of Pressure Reduction)

LiPF$_6$ (37.2 g, 0.24 mol) obtained by immobilization of PF$_5$ in the same manner as in Example 1 was heated to 200° C. Heating was continued for 3 hours at a pressure of 0.5 MPa·G only to evolve 10.8 g (0.08 mol) of PF$_5$.

Comparative Example 4

Influence of Temperature in Decomposition Step (Influence of Low Temperature)

The same procedure as in Example 1 was followed except for changing the thermal decomposition temperature to 100° C. The heating was continued for one hour only to produce less than 50 ppm of PF$_5$.

DESCRIPTION OF REFERENCE NUMERALS 1. reactor
2. heater
3. thermometer
4. pressure gauge
5. inlet for introducing low purity PF$_5$
6. Inlet for introducing inert gas
7. outlet
8. vacuum pump
9. MF$_n$
10. mixed gas outlet
11. high purity PF$_5$ gas collector

The invention claimed is:

1. A process for purifying phosphorus pentafluoride comprising (1) an immobilization step in which phosphorus pentafluoride (PF$_5$) containing an impurity is brought into contact with a metal fluoride MF$_n$, wherein M is an n-valent metal having a specific surface area of 1.0 m$^2$/g or more, at 40° to 150° C. to form a reaction system to immobilize phosphorus pentafluoride in the form of a hexafluorophosphate (M(PF$_6$)$_n$), (2) a separation step in which the impurity remaining in a gas phase is expelled out of the reaction system to separate the impurity from the hexafluorophosphate, and (3) a heat-decomposition step in which the hexafluorophosphate freed of the impurity is heated at 150° to 400° C. under a pressure of −0.1 to 0.1 MPa·G to give phosphorus pentafluoride.

2. The process according to claim 1, wherein the impurity in the phosphorus pentafluoride ($PF_5$) used in (1) the immobilization step contains at least one of HF, HCl, $F_2$, $Cl_2$, $CO_2$, $SO_3$, $POF_3$, $SO_2$, $H_2S$, $PF_3$, $NO_2$, $NO_3$, and $NH_3$.

3. The process according to claim 1, wherein the contact in (1) the immobilization step is carried out at a contact temperature of 40° to 150° C. under a pressure of 0 to 1.5 MPa·G.

4. The process according to claim 1, wherein the metal fluoride ($MF_n$) used in (1) the immobilization step is a monovalent metal fluoride, the metal being at least one member selected from the group consisting of lithium, sodium, potassium, and cesium.

5. The process according to claim 1, wherein (2) the separation step is carried out by expelling the impurity remaining in the gas phase out of the reaction system to separate the impurity from a solid $M(PF_6)_n$.

6. The process according to claim 1, wherein (3) the heat-decomposition step is carried out by evolving phosphorus pentafluoride with a reduced content of the impurity under a pressure of −0.1 to 0.1 MPa·G and selectively discharging the evolved phosphorus pentafluoride from the reaction system.

7. The process according to claim 1, wherein (3) the heat-decomposition step further comprises separating the metal fluoride (MF), and the metal fluoride ($MF_n$) separated in (3) the heat-decomposition step is reused in (1) the immobilization step.

8. The process according to claim 2, wherein the contact in (1) the immobilization step is carried out at a contact temperature of 40° to 150° C. under a pressure of 0 to 1.5 MPa·G.

9. The process according to claim 2, wherein the metal fluoride ($MF_n$) used in (1) the immobilization step is a monovalent metal fluoride, the metal being at least one member selected from the group consisting of lithium, sodium, potassium, and cesium.

10. The process according to claim 3, wherein the metal fluoride ($MF_n$) used in (1) the immobilization step is a monovalent metal fluoride, the metal being at least one member selected from the group consisting of lithium, sodium, potassium, and cesium.

11. The process according to claim 2, wherein (2) the separation step is carried out by expelling the impurity remaining in the gas phase out of the reaction system to separate the impurity from a solid $M(PF_6)_n$.

12. The process according to claim 3, wherein (2) the separation step is carried out by expelling the impurity remaining in the gas phase out of the reaction system to separate the impurity from a solid $M(PF_6)_n$.

13. The process according to claim 4, wherein (2) the separation step is carried out by expelling the impurity remaining in the gas phase out of the reaction system to separate the impurity from a solid $M(PF_6)_n$.

14. The process according to claim 2, wherein (3) the heat-decomposition step is carried out by evolving phosphorus pentafluoride with a reduced content of the impurity under a pressure of −0.1 to 0.1 MPa·G and selectively discharging the evolved phosphorus pentafluoride from the reaction system.

15. The process according to claim 3, wherein (3) the heat-decomposition step is carried out by evolving phosphorus pentafluoride with a reduced content of the impurity under a pressure of −0.1 to 0.1 MPa·G and selectively discharging the evolved phosphorus pentafluoride from the reaction system.

16. The process according to claim 4, wherein (3) the heat-decomposition step is carried out by evolving phosphorus pentafluoride with a reduced content of the impurity under a pressure of −0.1 to 0.1 MPa·G and selectively discharging the evolved phosphorus pentafluoride from the reaction system.

17. The process according to claim 5, wherein (3) the heat-decomposition step is carried out by evolving phosphorus pentafluoride with a reduced content of the impurity under a pressure of −0.1 to 0.1 MPa·G and selectively discharging the evolved phosphorus pentafluoride from the reaction system.

18. The process according to claim 2, wherein (3) the heat-decomposition step further comprises separating the the metal fluoride ($MF_n$), and the metal fluoride ($MF_n$) separated in (3) the heat-decomposition step is reused in (1) the immobilization step.

19. The process according to claim 3, wherein (3) the heat-decomposition step further comprises separating the metal fluoride ($MF_n$), and the metal fluoride ($MF_n$) separated in (3) the heat-decomposition step is reused in (1) the immobilization step.

20. The process according to claim 4, wherein (3) the heat-decomposition step further comprises separating the metal fluoride ($MF_n$), the metal fluoride ($MF_n$) separated in (3) the heat-decomposition step is reused in (1) the immobilization step.

\* \* \* \* \*